United States Patent
Kim et al.

(10) Patent No.: US 11,142,157 B2
(45) Date of Patent: Oct. 12, 2021

(54) AIRBAG SYSTEM FOR VEHICLE

(71) Applicants: HYUNDAI MOTOR COMPANY, Seoul (KR); KIA MOTORS CORPORATION, Seoul (KR)

(72) Inventors: Tae In Kim, Yongin-si (KR); Joo Seon Yoo, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 106 days.

(21) Appl. No.: 16/681,190

(22) Filed: Nov. 12, 2019

(65) Prior Publication Data

US 2020/0346607 A1 Nov. 5, 2020

(30) Foreign Application Priority Data

Apr. 30, 2019 (KR) .................. 10-2019-0050277

(51) Int. Cl.
| | |
|---|---|
| *B60R 21/214* | (2011.01) |
| *B60N 2/00* | (2006.01) |
| *B60N 2/02* | (2006.01) |
| *B60R 21/231* | (2011.01) |
| *B60R 21/00* | (2006.01) |

(52) U.S. Cl.
CPC ............ *B60R 21/214* (2013.01); *B60N 2/002* (2013.01); *B60N 2/02* (2013.01); *B60R 21/231* (2013.01); *B60R 2021/0032* (2013.01)

(58) Field of Classification Search
CPC ................ B60R 21/214; B60R 21/231; B60R 2021/0032; B60N 2/002; B60N 2/02; B60N 2/14
See application file for complete search history.

(56) References Cited

U.S. PATENT DOCUMENTS

| | | | | |
|---|---|---|---|---|
| 10,160,417 | B2 * | 12/2018 | Malapati | ............... B60R 21/264 |
| 10,821,930 | B2 * | 11/2020 | Malapati | ............. B60R 21/0136 |
| 2017/0129442 | A1 * | 5/2017 | Choi | ..................... B60R 21/214 |
| 2018/0229681 | A1 | 8/2018 | Jaradi et al. | |

(Continued)

FOREIGN PATENT DOCUMENTS

| | | |
|---|---|---|
| JP | 5194595 B2 | 5/2013 |
| JP | 2018-086886 A | 6/2018 |

(Continued)

*Primary Examiner* — James A English
*Assistant Examiner* — Kurtis Nielson
(74) *Attorney, Agent, or Firm* — Morgan, Lewis & Bockius LLP

(57) ABSTRACT

An airbag system for a vehicle includes: a plurality of airbag modules disposed at a roof of a vehicle, allowing a cushion to be deployed toward an indoor space of the vehicle when deployed, and arranged to correspond to respective seats of the vehicle; at least one actuator configured to move an airbag module of the plurality of airbag modules in a longitudinal or lateral direction of the vehicle and to rotate the airbag module in place; and a controller controlling the at least one actuator to move the airbag module corresponding to a matched seat of the vehicle when a position of a seat or a reclined angle of a seatback is changed, and to rotate the airbag module when an orientation angle of the seat is changed, and to control the cushion of the airbag module to be deployed when a vehicle collision occurs.

10 Claims, 10 Drawing Sheets

(56) References Cited

U.S. PATENT DOCUMENTS

| | | | | |
|---|---|---|---|---|
| 2019/0084517 | A1* | 3/2019 | Iyer | B60N 2/143 |
| 2019/0337479 | A1* | 11/2019 | Hill | B60R 21/01512 |
| 2020/0070763 | A1* | 3/2020 | Hill | B60R 21/233 |
| 2020/0122665 | A1* | 4/2020 | Shin | B60R 21/01554 |
| 2020/0130627 | A1* | 4/2020 | Imura | B60R 21/0134 |
| 2020/0290549 | A1* | 9/2020 | Buice | B60R 21/0136 |

FOREIGN PATENT DOCUMENTS

| | | |
|---|---|---|
| KR | 10-1219694 B1 | 1/2013 |
| KR | 10-1724944 B1 | 4/2017 |
| KR | 10-1931125 B1 | 12/2018 |

\* cited by examiner

[FIG. 1]
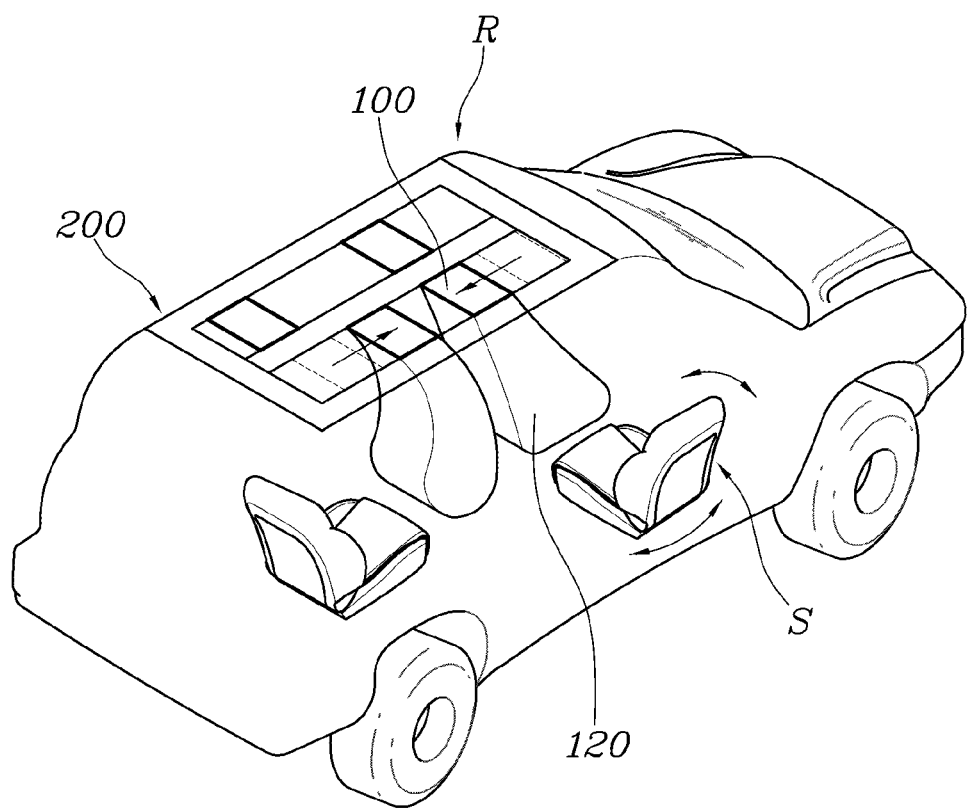

[FIG. 2]
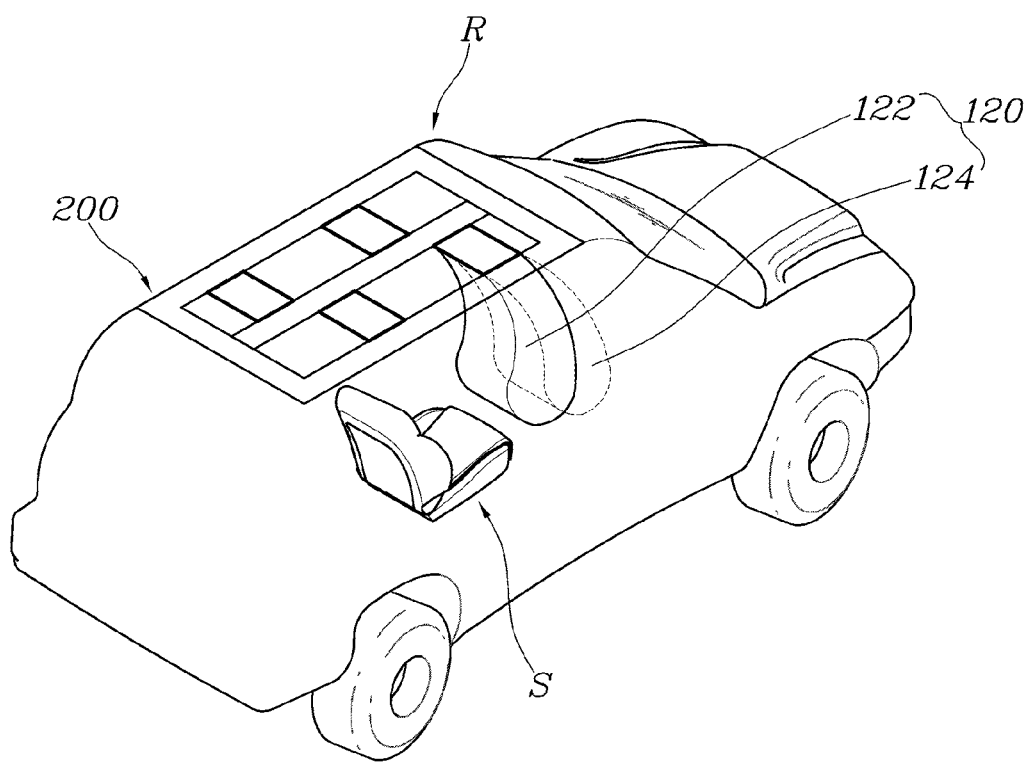

[FIG. 3]
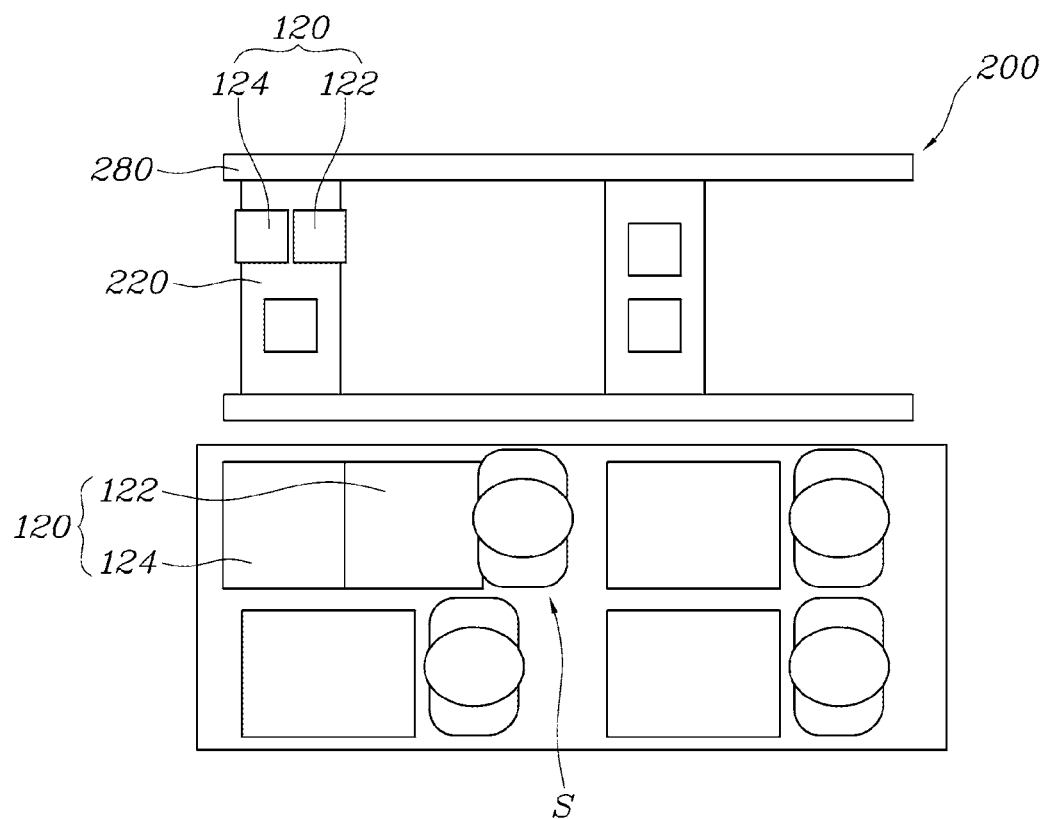

[FIG. 4]
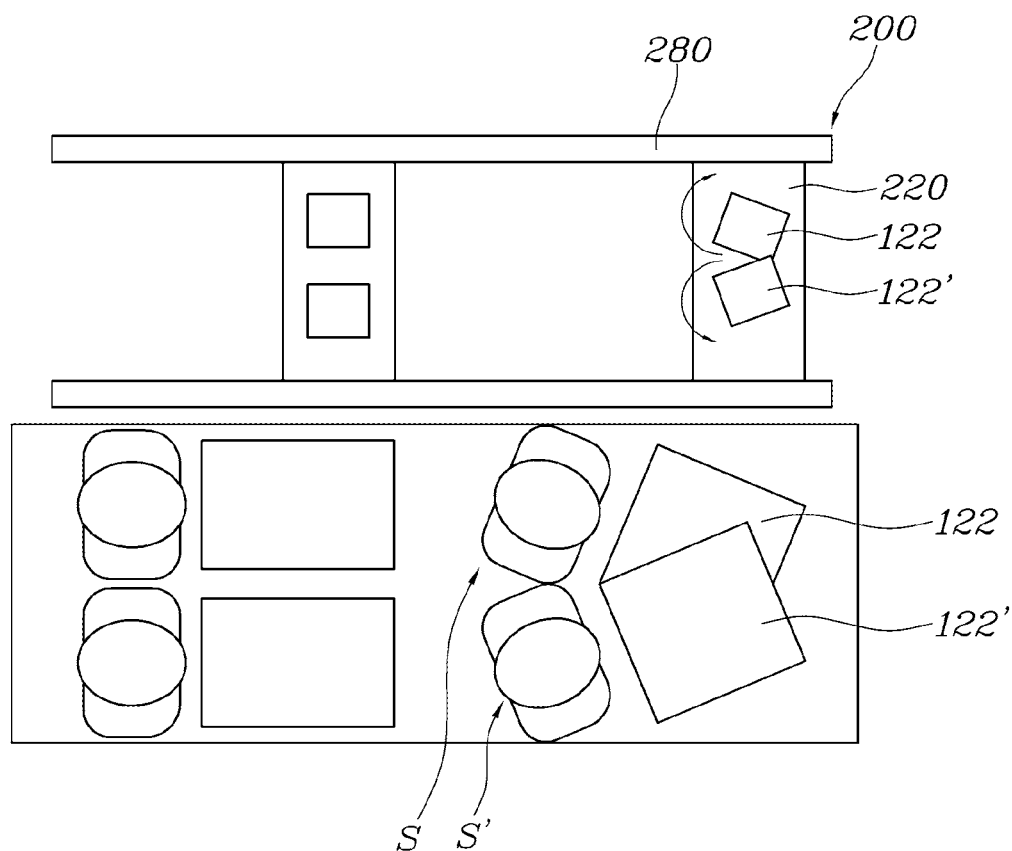

[FIG. 5]
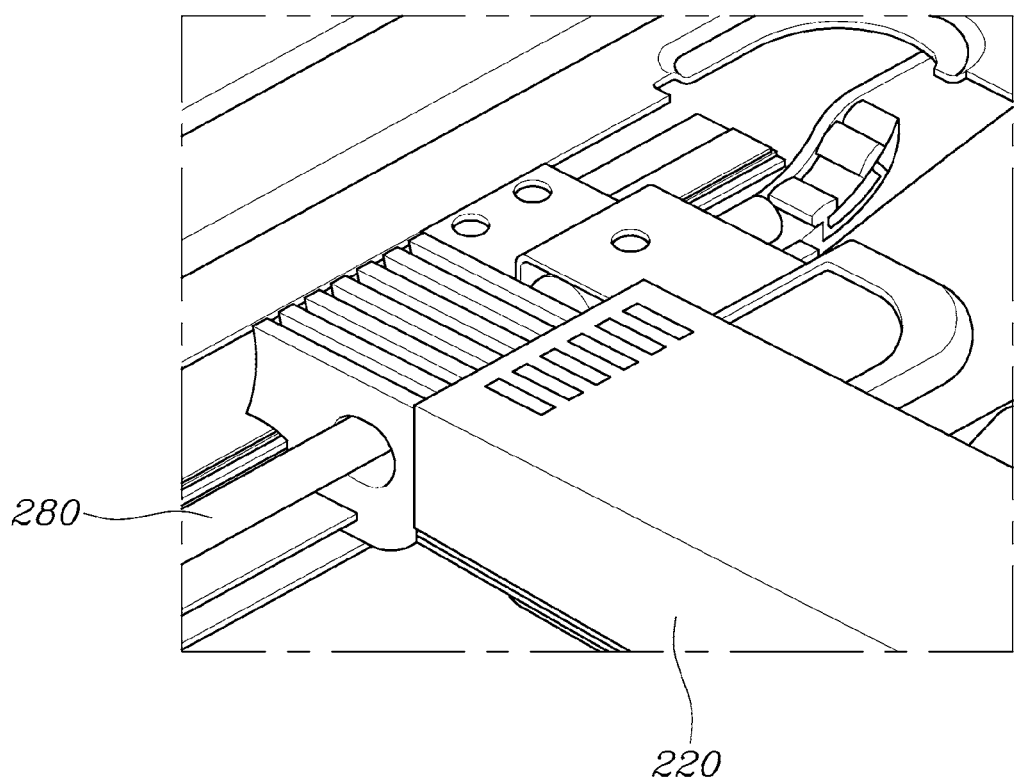

[FIG. 6]
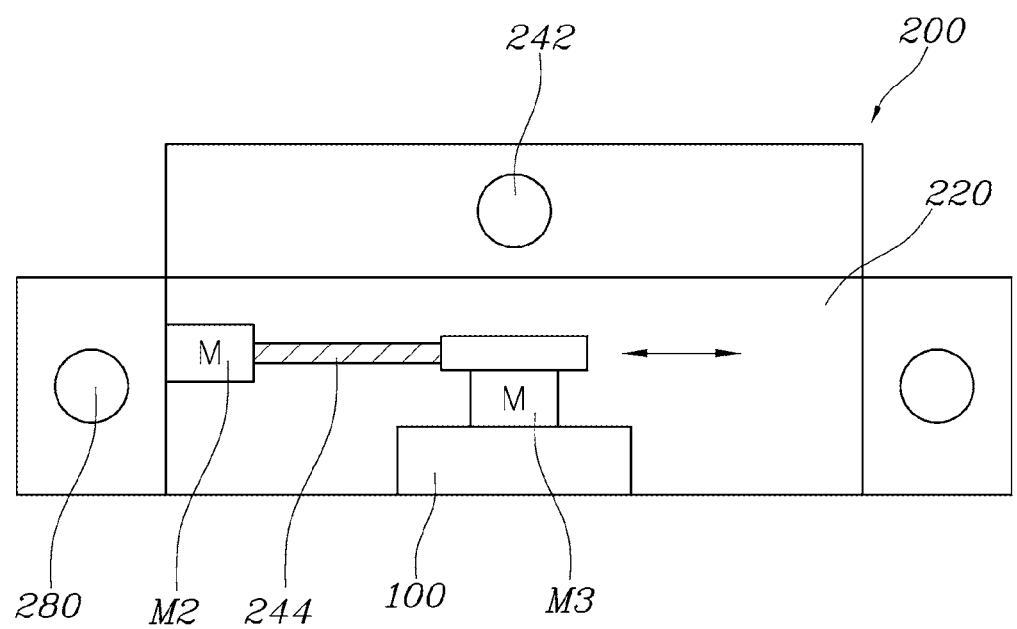

[FIG. 7]
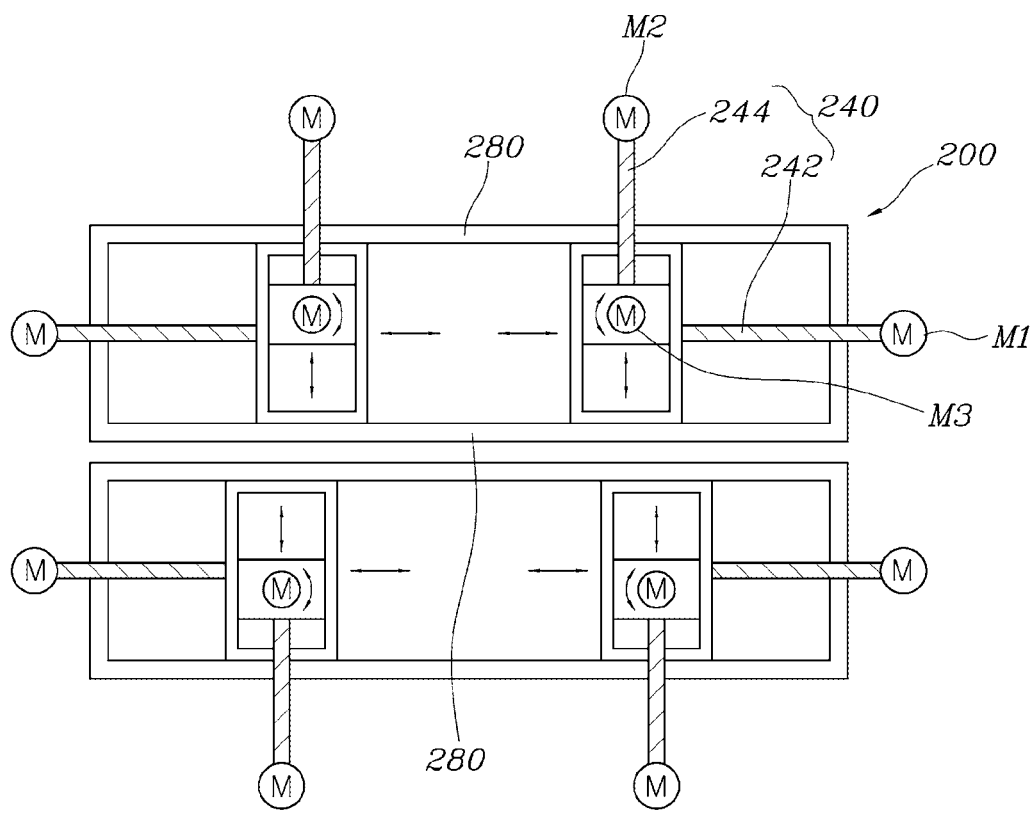

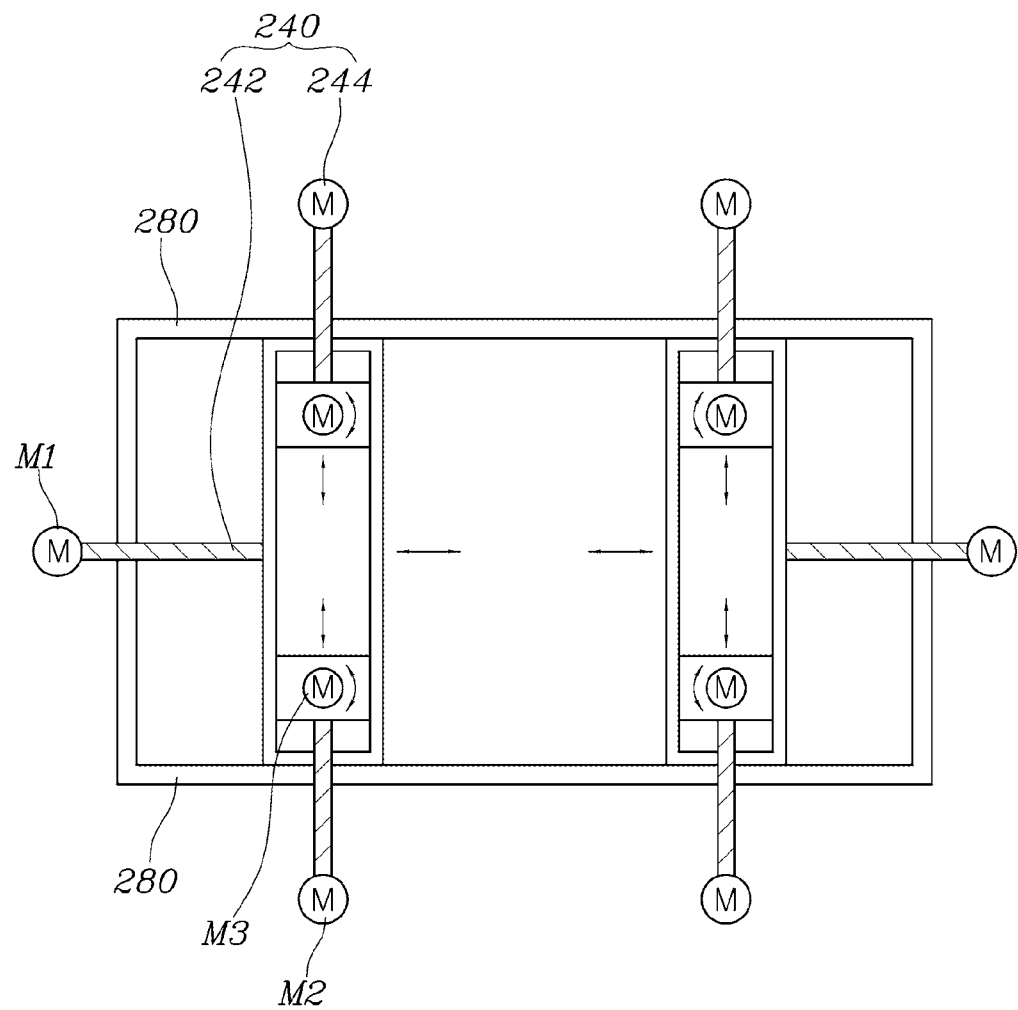
[FIG. 8]

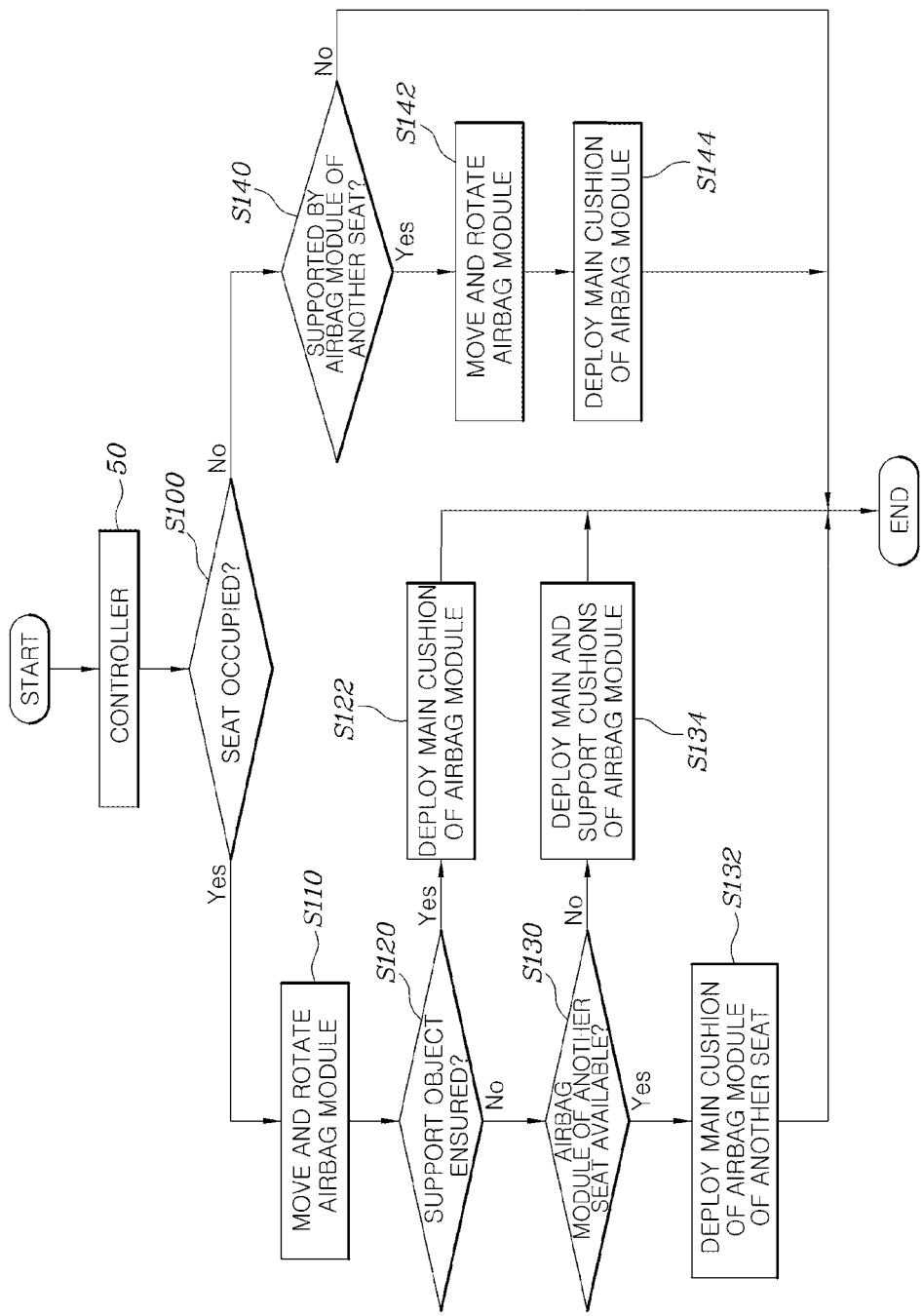

[FIG. 10]
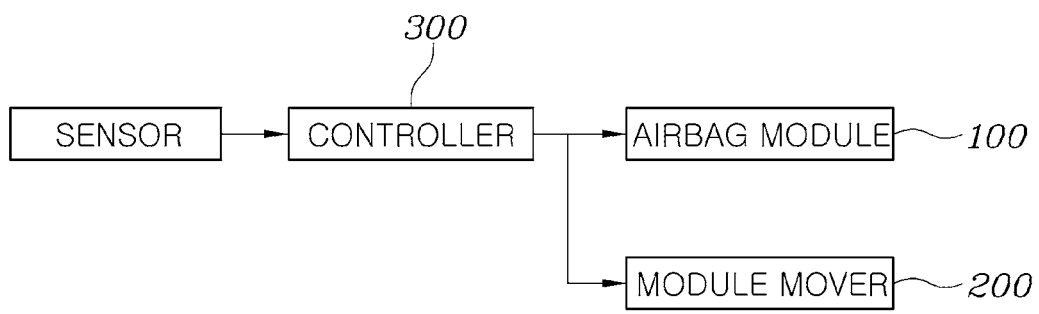

AIRBAG SYSTEM FOR VEHICLE

CROSS REFERENCE TO RELATED APPLICATION

The present application claims the benefit of priority to Korean Patent Application No. 10-2019-0050277, filed on Apr. 30, 2019 in the Korean Intellectual Property Office, the entire disclosure of which is incorporated herein by reference.

TECHNICAL FIELD

The present disclosure relates to an airbag system for a vehicle in a field of vehicle safety, in which an airbag module is moved corresponding to a seat position and a seatback reclining, and thus allowing a cushion of the airbag module to be deployed toward an occupant when deployed.

BACKGROUND

In general, various airbag systems may be installed in a vehicle. These airbag systems may be installed at respective portions of a vehicle body and may be deployed toward an occupant when a vehicle collision occurs lest the occupant directly collide with the vehicle body or the like. Accordingly, as an airbag cushion mitigates impact of the vehicle collision, safety of the occupant may be secured.

In accordance with a recent trend to develop an autonomous vehicle, the vehicle may perform not only a transportation function, but also functions of a rest space and a work space. Accordingly, an occupied seat in an indoor space of the vehicle may be provided to be movable and rotatable. Therefore, the seat in the indoor space of the vehicle may have various positions (position and angle).

However, a conventional airbag system for a vehicle is generally installed at a fixed position in a vehicle body. Accordingly, the conventional airbag system is difficult to restrain an occupant in various positions and postures.

Therefore, there is a need for a new vehicle airbag system to solve such a problem.

The contents described as the related art have been provided only to assist in understanding the background of the present disclosure and should not be considered as corresponding to the related art known to those having ordinary skill in the art.

SUMMARY

An object of the present disclosure is to provide an airbag system for a vehicle in a field of vehicle safety, in which an airbag module is moved corresponding to a seat position and a seatback reclining, and thus allowing a cushion of the airbag module to be deployed toward an occupant when deployed.

According to an exemplary embodiment of the present disclosure, an airbag system for a vehicle may include: a plurality of airbag modules disposed at a roof of a vehicle, allowing a cushion to be deployed toward an indoor space of the vehicle when deployed, and arranged to correspond to respective seats of the vehicle; at least one actuator configured to move an airbag module of the plurality of airbag modules in a longitudinal or lateral direction of the vehicle and to rotate the airbag module in place; and a controller configured to control the at least one actuator to move the airbag module corresponding to a matched seat of the vehicle when a position of a seat or a reclined angle of a seatback is changed, and to rotate the airbag module when an orientation angle of the seat is changed. The controller is further configured to control the cushion of the airbag module to be deployed when a vehicle collision occurs.

The at least one actuator may include: a base on which the airbag module is disposed; a slider configured to move the airbag module in the longitudinal or lateral direction of the vehicle; and a rotary actuator configured to rotate the airbag module in place at the base.

The slider may include: a first slider, having a first actuator disposed at one side thereof, configured to move the base by a movement of the first actuator and to move the airbag module in the longitudinal direction of the vehicle; and a second slider, having a second actuator disposed at another side thereof, configured to move the airbag module in the lateral direction of the vehicle by a movement of the second actuator.

The first and second sliders may each have a thread portion at an outer surface thereof; the first and second actuators may each include a motor; the base may move in the longitudinal direction of the vehicle by a rotation of the first actuator; and the airbag module may move in the lateral direction of the vehicle by a rotation of the second actuator.

The at least one actuator may further include guides spaced apart from the first slider and disposed at both sides of the first slider. Each of the guides may have a rail structure, and both sides of the base may be respectively fastened to the guides.

The cushion of the airbag module may include a main cushion and a support cushion, and when deployed, the main cushion may be deployed toward an occupant and the support cushion may be deployed to support the main cushion.

The controller may sense an occupancy, the position, and the orientation angle of the seat, and the reclined angle of the seatback.

When the seat is occupied, the controller may control the airbag module corresponding to the matched seat to be moved or be rotated and may control the cushion of the airbag module corresponding to the matched seat to be deployed toward the occupant.

When the cushion of the airbag module is deployed and a support object is ensured, the controller may control the main cushion of the airbag module corresponding to the matched seat to be deployed alone.

When the cushion of the airbag module is deployed and no support object is ensured, the controller may control the main cushion of the airbag module corresponding to another seat to be deployed.

When the cushion of the airbag module is deployed and no support object is ensured, the controller may control the main cushion and the support cushion of the airbag module corresponding to the matched seat to be deployed together.

The controller may control the airbag module corresponding to an unoccupied seat to be moved or be rotated so as to be disposed adjacent to the airbag module corresponding to another occupied seat.

When the main cushion of the airbag module corresponding to the another occupied seat is deployed, the controller may control the main cushion of the airbag module corresponding to the unoccupied seat to be deployed.

BRIEF DESCRIPTION OF THE DRAWINGS

FIG. 1 is a view illustrating an airbag system for a vehicle according to an exemplary embodiment of the present disclosure.

FIG. 2 is a view illustrating a state in which a main cushion and a support cushion of an airbag system for a vehicle are deployed according to an exemplary embodiment of the present disclosure.

FIG. 3 is a view illustrating a state in which a cushion of an airbag module of an airbag system for a vehicle is deployed according to an exemplary embodiment of the present disclosure.

FIG. 4 is a view illustrating a state in which cushions of an airbag module of an airbag system for a vehicle are deployed to support each other according to an exemplary embodiment of the present disclosure.

FIG. 5 is a view illustrating a guide of an airbag system for a vehicle according to an exemplary embodiment of the present disclosure.

FIG. 6 is a view illustrating a module mover of an airbag system for a vehicle according to an exemplary embodiment of the present disclosure.

FIGS. 7 and 8 are views illustrating an airbag system for a vehicle according to an exemplary embodiment of the present disclosure.

FIG. 9 is a view illustrating a control of an airbag system for a vehicle according to an exemplary embodiment of the present disclosure.

FIG. 10 is a view illustrating a controller of an airbag system for a vehicle according to an exemplary embodiment of the present disclosure.

DETAILED DESCRIPTION

Hereinafter, an airbag system for a vehicle according to exemplary embodiments of the present disclosure is described with reference to the accompanying drawings.

FIG. 1 is a view illustrating an airbag system for a vehicle according to an exemplary embodiment of the present disclosure; FIG. 2 is a view illustrating a state in which a main cushion and a support cushion of an airbag system for a vehicle are deployed according to an exemplary embodiment of the present disclosure; FIG. 3 is a view illustrating a state in which a cushion of an airbag module of an airbag system for a vehicle is deployed according to an exemplary embodiment of the present disclosure; FIG. 4 is a view illustrating a state in which cushions of an airbag module of an airbag system for a vehicle are deployed to support each other according to an exemplary embodiment of the present disclosure; FIG. 5 is a view illustrating a guide of an airbag system for a vehicle according to an exemplary embodiment of the present disclosure; FIG. 6 is a view illustrating a module mover of an airbag system for a vehicle according to an exemplary embodiment of the present disclosure; FIGS. 7 and 8 are views illustrating an airbag system for a vehicle according to an exemplary embodiment of the present disclosure; FIG. 9 is a view illustrating a control of an airbag system for a vehicle according to an exemplary embodiment of the present disclosure; and FIG. 10 is a view illustrating a controller of an airbag system for a vehicle according to an exemplary embodiment of the present disclosure.

As illustrated in FIGS. 1 to 4, an airbag system for a vehicle according to an exemplary embodiment of the present disclosure may include: a plurality of airbag modules 100 installed at a roof R of a vehicle, allowing cushions 120 to be deployed toward an indoor space of the vehicle, and corresponding to respective seats S of the vehicle when deployed; a module mover 200 allowing each of the airbag modules 100 to be moved at the roof R of the vehicle in longitudinal or lateral direction of the vehicle and also to be rotated in its place; and a controller 50 controlling the module mover 200 to move an airbag module 100 corresponding to a matched seat S of the vehicle when a position of the seat S or a reclined angle of a seatback is changed and to rotate the airbag module 100 when an orientation angle of the seat S is changed, and controlling the cushion 120 of the airbag module 100 to be deployed when a vehicle collision occurs.

In the present disclosure, the plurality of airbag modules 100 may be installed at the roof R of the vehicle. The plurality of airbag modules 100 may correspond to the respective seats S of the vehicle. In addition, each of the airbag modules 100 may include an inflator (not illustrated) and the cushion 120. Accordingly, when the vehicle collision occurs, the cushion 120 may be deployed toward the indoor space of the vehicle by a trigger of an inflator, thereby restricting an occupant.

Meanwhile, an autonomous vehicle may perform not only a transportation function, but also functions of a rest space and a work space. Accordingly, seats movable and rotatable may be provided in the vehicle; and thus, as illustrated in FIG. 1, the seats may be opposed to each other or moved in the indoor space of the vehicle to have various seat positions.

A conventional airbag system for a vehicle is installed at a fixed position, and an airbag cushion is deployed only to a preset position. Accordingly, the conventional airbag system for a vehicle may not sufficiently protect the occupant when the seat is moved and rotated in the indoor space of the vehicle or depending on the reclined angle of the seatback.

To solve this problem, the present disclosure may provide the module mover 200 as illustrated in FIGS. 7 and 8. The module mover 200 may allow each of the airbag modules 100 to be moved at the roof R of the vehicle in the longitudinal or lateral direction of the vehicle and also to be rotated in its place. Therefore, when the seat S is moved or the seatback is reclined in the indoor space of the vehicle, the airbag module 110 corresponding to the matched seat may be moved at the roof R of the vehicle in the longitudinal or lateral direction of the vehicle so that the cushion 120 is deployed toward the occupant. In addition, when the seat S is rotated, the corresponding airbag module 100 may be rotated so that the cushion 120 is deployed toward a front of the occupant. For example, when the seat S is rotated in a clockwise direction, the airbag module 100 may be rotated in a counterclockwise direction so that the cushion 120 is deployed toward the front of the occupant when deployed.

In addition, the present disclosure may provide the controller 50. The controller 50 according to an exemplary embodiment of the present disclosure may be a processor (e.g., computer, microprocessor, CPU, ASIC, circuitry, logic circuits etc.). The controller 50 may be implemented by a non-volatile memory (not illustrated) configured to store, e.g., a program(s), software instructions reproducing algorithms, etc., which, when executed, controls operations of various components of the vehicle, and a processor (not illustrated) configured to execute the program(s), software instructions reproducing algorithms, etc., stored in the memory. Here, the memory and the processor may be implemented as separate semiconductor circuits. Alternatively, the memory and the processor may be implemented as a single integrated semiconductor circuit. The processor may embody one or more processor(s). The controller 50 may control the module mover 200 to move the airbag module 100 corresponding to the matched seat S of the vehicle when the position of the seat S or the reclined angle of the seatback is changed; and may also control the module mover 200 to rotate the airbag module 100 when the orientation angle of the seat S is changed. In addition, the controller 50 may control the cushion 120 of the airbag module 100 to be deployed when the vehicle collision occurs.

Meanwhile, as illustrated in FIGS. 6 to 8, the module mover 200 may include: a base 220 on which the airbag module 100 is disposed; a slider 240 allowing the airbag module 100 to be moved at the roof R of the vehicle in the longitudinal or lateral direction of the vehicle; and a rotator M3 (e.g., a rotary actuator) allowing the airbag module 100 to be rotated in its place at the base 220. The module mover 200 may include the base 220, the slider 240, and the rotator M3. The airbag module 100 may be installed at the base 220. In addition, the airbag module 100 may be moved at the roof R of the vehicle by a movement of the slider 240 of the module mover 200 in the longitudinal or lateral direction of the vehicle. The rotator M3 of the module mover 200 may allow the airbag module 100 to be rotated in its place at the base 220.

In detail, as illustrated in FIGS. 6 to 8, the slider 240 may include: a first slider 242 having a first mover M1 (e.g., a first actuator) installed at one side thereof, allowing the base 220 to be moved by a movement of the first mover M1, and thereby allowing the airbag module 100 to be moved in the longitudinal direction of the vehicle; and a second slider 244 having a second mover M2 (e.g., a second actuator) installed at one side thereof, and allowing the airbag module 100 to be moved in the lateral direction of the vehicle by a movement of the second mover M2. The first slider 242 may have the first mover M1 installed at one side thereof. The base 220 may be moved in the longitudinal direction of the vehicle by the movement of the first mover M1. Accordingly, the airbag module 100 installed at the base 220 may also be moved in the longitudinal direction of the vehicle. In the present disclosure, as illustrated in FIG. 7, each of the airbag modules 100 may be installed at a plurality of the bases 220. In addition, according to another exemplary embodiment of the present disclosure, as illustrated in FIG. 8, a plurality of airbag modules 100 may be installed at a single base 220. Meanwhile, the second slider 244 may have the second mover M2 installed at one side thereof, and thus the airbag module 100 may be moved in the lateral direction of the vehicle by the movement of the second mover M2. Accordingly, the airbag module 100 may be moved depending on a change in a position of the seat S and a seatback reclining in the longitudinal or lateral direction of the vehicle.

In more detail, the first and second sliders 242 and 244 may each have a shape of a bolt having a thread portion; the first and second movers M1 and M2 may each be a motor; the base 220 may be moved in the longitudinal direction of the vehicle by a rotation of the first mover M1; and the airbag module 100 may be moved in the lateral direction of the vehicle by a rotation of the second mover M2. The base 220 may be fastened to the first slider 242. Accordingly, the first mover M1 installed at one side of the first slider 242 may be rotated to move the base 220 in the longitudinal direction of the vehicle. The first slider 242 may have a shape of the bolt having a thread portion and thus, the base 220 may be moved by a rotation of the thread portion of the first slider 242 in the longitudinal direction of the vehicle. Therefore, the airbag module 100 installed at the base 220 may be moved in the longitudinal direction of the vehicle. In addition, the second mover M2 installed at one side of the second slider 244 may be rotated to move the airbag module 100 in the lateral direction of the vehicle. The second slider 244 may have a shape of the bolt having a thread portion and thus, the airbag module 100 may be moved in the lateral direction of the vehicle by a rotation of the thread portion of the second slider 244. In addition, the rotator M3 of the module mover 200 may be a motor, and thus the airbag module 100 may be rotated in its place by a rotation of the rotator M3.

In addition, as illustrated in FIGS. 5, 7 and 8, the module mover 200 may further include guides 280 spaced apart from the first slider 242 and installed at both sides of the first slider 242, and the guides 280 may each have a rail structure and the both sides of the base 220 may be fastened to the respective guides 280. The both sides of the base 220 may be fastened to the respective guides 280. The guides 280 may be installed to be spaced apart from the first slider 242 and respectively extended at the both sides of the first slider 242 in the longitudinal direction of the vehicle. Accordingly, the guides 280 may each have the rail structure, such that the base 220 is supported by the guides 280 at the both sides of the base 220. In addition, when moved in the longitudinal direction of the vehicle, the base 220 may not be shaken.

In addition, as illustrated in FIGS. 2 and 3, the cushion 120 of each of the airbag modules 100 may include a main cushion 122 and a support cushion 124, and when deployed, the main cushion 122 may be deployed toward the occupant and the support cushion 124 may be deployed to support the main cushion 122. The airbag module 100 may be installed at the roof R of the vehicle and thus, the cushion 120 may be deployed toward the indoor space of the vehicle. Meanwhile, when the cushion 120 is deployed alone and there is no object supporting the cushion 120 in the indoor space of the vehicle, the cushion 120 may be shaken and not sufficiently restrain the occupant. Therefore, according to an exemplary embodiment of the present disclosure, the cushion 120 may include the main cushion 122 and the support cushion 124, and when deployed, the main cushion 122 may be deployed toward the occupant and the support cushion 124 may be deployed to support the main cushion 122. When the main cushion 122 is deployed and there is an object supporting the main cushion 122 in the indoor space of the vehicle, the main cushion 122 may be allowed to be deployed alone. Whereas, when the main cushion 122 is deployed and there is no object supporting the main cushion 122, the support cushion 124 may also be allowed to be deployed to support the main cushion 122. Accordingly, when the support cushion 124 supports the main cushion 122, the main cushion may not be shaken, and thus safety of the occupant may be improved.

FIG. 9 is a view illustrating a control of an airbag system for a vehicle according to an exemplary embodiment of the present disclosure; and FIG. 10 is a view illustrating a controller of an airbag system for a vehicle according to an exemplary embodiment of the present disclosure. The controller 50 may sense the occupancy, position and orientation angle of the seat S, and the reclined angle of the seatback. To this end, the controller 50 may include a sensor. As an example of the sensor, a camera sensor may sense the occupancy, position and orientation angle of the seat S, and the reclined angle of the seatback in the indoor space of the vehicle. An another example of the sensor, a seat information sensor (a seat position sensor, a seat rotation sensor, a seatback reclining sensor, a seat occupancy sensor, or the like) may be installed at the seat to sense the occupancy, position and orientation angle of the seat S, and the reclined angle of the seatback in the indoor space of the vehicle. Meanwhile, when receiving information on the seat occupancy (S100), the position and orientation angle of the seat, the reclined angle of the seatback and the like, the controller 50 may control each of the airbag modules 100 to be disposed corresponding to a matched seat S.

In detail, when the seat S is occupied (S100), the controller 50 may control the airbag module 100 corresponding to the matched seat S to be moved or be rotated and then the cushion 120 of the corresponding airbag module 100 to be deployed toward the occupant. The controller 50 may control the airbag module 100 corresponding to the occupied seat S to be moved in the longitudinal or lateral direction of the vehicle and then the cushion 120 of the corresponding airbag module 100 to be deployed toward the occupant when deployed. In addition, when the seat S is rotated, the controller 50 may control the corresponding airbag module 100 to be rotated corresponding to the matched seat S.

In addition, when the cushion 120 of the airbag module 100 is deployed and a support object is ensured, the controller 50 may control the main cushion 122 of the corresponding airbag module 100 to be deployed alone (S120 and S122). That is, when the cushion 120 of the airbag module 100 is deployed and the support object is ensured, the controller 50 may control the main cushion 122 of the corresponding airbag module 100 to be deployed alone and the support cushion 124 not to be deployed. The reason is because when the support cushion 124 is also deployed, the support cushion 124 and the support object may interfere with each other.

In addition, when the cushion 120 of the airbag module 100 is deployed and no support object is ensured, the controller 50 may control the main cushion 122 of the airbag module 100 corresponding to another seat to be deployed (S120, S130 and S132). When the main cushion 122 of the airbag module 100 corresponding to the another seat is deployed to support the cushion 120 of the airbag module 100, the controller 50 may control the main cushion 122 of the airbag module 100 corresponding to the another seat to be also deployed. Accordingly, the main cushion 122 of the airbag module 100 corresponding to the another seat may support the main cushion 122 of the airbag module 100.

In addition, when the cushion 120 of the airbag module 100 is deployed and no support object is ensured, the controller 50 may control the main cushion 122 and support cushion 124 of the corresponding airbag module 100 to be deployed together (S120, S130 and S134). That is, when the cushion 120 of the airbag module 100 is deployed and neither the support object nor the cushion 120 of the airbag module 100 corresponding to the another seat is ensured, the main cushion 122 and support cushion 124 of the corresponding airbag module 100 may be deployed together. In this case, the support cushion 124 of the airbag module 100 may support the main cushion 122.

In addition, the controller 50 may control the airbag module 100 corresponding to an unoccupied seat S to be moved or be rotated to be disposed adjacent to the airbag module 100 corresponding to another occupied seat (S100, S140 and S142). In more detail, when the main cushion 122 of the airbag module 100 corresponding to the another occupied seat is deployed, the controller 50 may control the main cushion 122 of the airbag module 100 corresponding to the unoccupied seat S to be deployed (S100, S140, S142 and S144). In this case, the airbag module 100 of the unoccupied seat S may support the airbag module 100 corresponding to the another occupied seat. Accordingly, when the main cushion 122 of the airbag module 100 of the another occupied seat is deployed, the main cushion 122 of the airbag module 100 corresponding to the unoccupied seat may be used to support the main cushion 122 of the airbag module 100 of the another occupied seat.

According to the airbag system for a vehicle in the field of vehicle safety of the present disclosure, the airbag module is moved and rotated corresponding to the seat position and the seatback reclining, thus allowing the cushion of the airbag module to be deployed toward an occupant when deployed.

Although the present disclosure has been shown and described with respect to specific embodiments, it is apparent to those having ordinary skill in the art that the present disclosure may be variously modified and altered without departing from the spirit and scope of the present disclosure as defined by the following claims.

What is claimed is:

1. An airbag system for a vehicle comprising:
   a plurality of airbag modules disposed at a roof of a vehicle, allowing a cushion to be deployed toward an indoor space of the vehicle when deployed, and arranged to correspond to respective seats of the vehicle;
   at least one actuator configured to move an airbag module of the plurality of airbag modules in a longitudinal or lateral direction of the vehicle and to rotate the airbag module in place; and
   a controller configured to:
   control the at least one actuator to move the airbag module corresponding to a matched seat of the vehicle when a position of the seat or a reclined angle of a seatback is changed, and to rotate the airbag module when an orientation angle of the seat is changed, and
   control the cushion of the airbag module to be deployed when a vehicle collision occurs,
   wherein the at least one actuator includes:
   a base on which the airbag module is disposed;
   a slider configured to move the airbag module in the longitudinal or lateral direction of the vehicle; and
   a rotary actuator configured to rotate the airbag module in place at the base,
   wherein the slider includes:
   a first slider, comprising a first actuator disposed at one side thereof, configured to move the base by a movement of the first actuator and to move the airbag module in the longitudinal direction of the vehicle; and
   a second slider, comprising a second actuator disposed at another side thereof, configured to move the airbag module in the lateral direction of the vehicle by a movement of the second actuator, and
   wherein the at least one actuator further includes guides spaced apart from the first slider and disposed at both sides of the first slider, and each of the guides has a rail structure and both sides of the base are respectively fastened to the guides.

2. The airbag system for a vehicle of claim 1,
   wherein each of the first and second sliders has a thread portion at an outer surface thereof;
   each of the first and second actuators includes a motor;
   the base moves in the longitudinal direction of the vehicle by a rotation of the first actuator; and
   the airbag module moves in the lateral direction of the vehicle by a rotation of the second actuator.

3. The airbag system for a vehicle of claim 1,
   wherein the cushion of the airbag module includes a main cushion and a support cushion, and when deployed, the main cushion is deployed toward an occupant and the support cushion is deployed to support the main cushion.

4. The airbag system for a vehicle of claim 3, wherein the controller senses an occupancy, the position, and the orientation angle of the seat, and the reclined angle of the seatback.

5. The airbag system for a vehicle of claim 4, wherein when the seat is occupied, the controller controls the airbag module corresponding to the matched seat to be moved or be rotated and controls the cushion of the airbag module corresponding to the matched seat to be deployed toward the occupant.

6. The airbag system for a vehicle of claim 5, wherein when the cushion of the airbag module is supported and deployed, the controller controls the main cushion of the airbag module corresponding to the matched seat to be deployed alone.

7. The airbag system for a vehicle of claim 6, wherein when the cushion of the airbag module is deployed without support, the controller controls the main cushion of the airbag module corresponding to another seat to be deployed.

8. The airbag system for a vehicle of claim 6, wherein when the cushion of the airbag module is deployed without support, the controller controls the main cushion and the support cushion of the airbag module corresponding to the matched seat to be deployed together.

9. The airbag system for a vehicle of claim 5, wherein the controller controls the airbag module corresponding to an unoccupied seat to be moved or be rotated so as to be disposed adjacent to the airbag module corresponding to another occupied seat.

10. The airbag system for a vehicle of claim 9, wherein when the main cushion of the airbag module corresponding to the another occupied seat is deployed, the controller controls the main cushion of the airbag module corresponding to the unoccupied seat to be deployed.

* * * * *